US012601842B2

(12) United States Patent
Kompala et al.

(10) Patent No.: US 12,601,842 B2
(45) Date of Patent: Apr. 14, 2026

(54) ACTIVATING SATELLITE SOS MODE IN LIMITED SERVICE

(71) Applicant: QUALCOMM Incorporated, San Diego, CA (US)

(72) Inventors: Surendra Kompala, Fremont, CA (US); Sachin Jain, Milpitas, CA (US); Shubham Panchadhar, Hyderabad (IN); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/302,821

(22) Filed: Apr. 19, 2023

(65) Prior Publication Data

US 2024/0353569 A1 Oct. 24, 2024

(51) Int. Cl.
*H04W 4/00* (2018.01)
*G01S 19/17* (2010.01)
*G08B 25/01* (2006.01)

(52) U.S. Cl.
CPC ............ *G01S 19/17* (2013.01); *G08B 25/016* (2013.01)

(58) Field of Classification Search
CPC .......... H04W 4/02; H04W 4/14; H04W 4/90; H04W 76/50
See application file for complete search history.

(56) References Cited

U.S. PATENT DOCUMENTS

| | | | |
|---|---|---|---|
| 5,659,545 A | 8/1997 | Sowles et al. | |
| 6,233,463 B1 | 5/2001 | Wiedeman et al. | |
| 2007/0157018 A1* | 7/2007 | Simon | H04M 11/04 |
| | | | 713/100 |
| 2011/0136428 A1* | 6/2011 | Ritter | H04B 7/18517 |
| | | | 455/13.4 |
| 2022/0174497 A1 | 6/2022 | Guo et al. | |
| 2022/0191696 A1 | 6/2022 | Yoshizawa et al. | |
| 2023/0066232 A1* | 3/2023 | Caro | H04B 7/18517 |

FOREIGN PATENT DOCUMENTS

WO 2022067803 A1 4/2022

OTHER PUBLICATIONS

ETSI Secretariat: "Emergency Communications (EMTEL), Transporting Handset Location to PSAPs for Emergency Communications—Advanced Mobile Location", RTS/EMTEL-00056, EMTEL (22)000045, Draft ETSI TS 103 625 v1.1.8, European Telecommunications Standards Institute (ETSI), 650, Route Des Lucioles, F-06921 Sophia-Antipolis, France, vol. TC EMTEL Emergency Communications, No. 1.1.8, Mar. 7, 2022, pp. 1-25, XP014426813, section 6.3.4.2.
International Search Report and Written Opinion—PCT/US2024/017635—ISA/EPO—Jun. 26, 2024. 16 pages.
(Continued)

*Primary Examiner* — Omoniyi Obayanju
(74) *Attorney, Agent, or Firm* — Polsinelli LLP

(57) ABSTRACT
Various embodiments include methods and wireless devices implementing such methods for detecting when the wireless device is operating in a limited service state (LSS) mode, transitioning from operating in LSS to satellite-based SOS mode in response to the wireless device operating in LSS mode, and sending a text message or initiating a voice call using the satellite-based SOS mode.

28 Claims, 7 Drawing Sheets

(56)     References Cited

OTHER PUBLICATIONS

Oorni R., et al., "In-Vehicle Emergency Call Services: eCall and Beyond", IEEE Communications Magazine, IEEE Service Center, Piscataway, US, vol. 55, No. 1, Jan. 1, 2017, pp. 159-165, XP011639267, abstract.
Cui Z., et al., "Attacks Against Security Context in 5G Network", arXiv:2303. 10955v1 [cs. CR] Mar. 20, 2023, pp. 1-16.
Etsi: "5G, Security Architecture and Procedures for 5G System (3GPP TS 33.501 Version 17.10.0 Release 17)", TS 133 501 V17.10.0, Jul. 2023, 296 Pages.

* cited by examiner

200

*300*

302 — Detect Wireless Device Is In Limited Service State

304 — Detect User Is Attempting To Send Text Message Or Place A Call

306 — Switch From Limited Service State To SDRM Mode Or SOS Mode

308 — Send Text Message And/or Initiate Voice Call Using Satellite SOS Mode

310 — Switch From SDRM Mode To Limited Service State

400

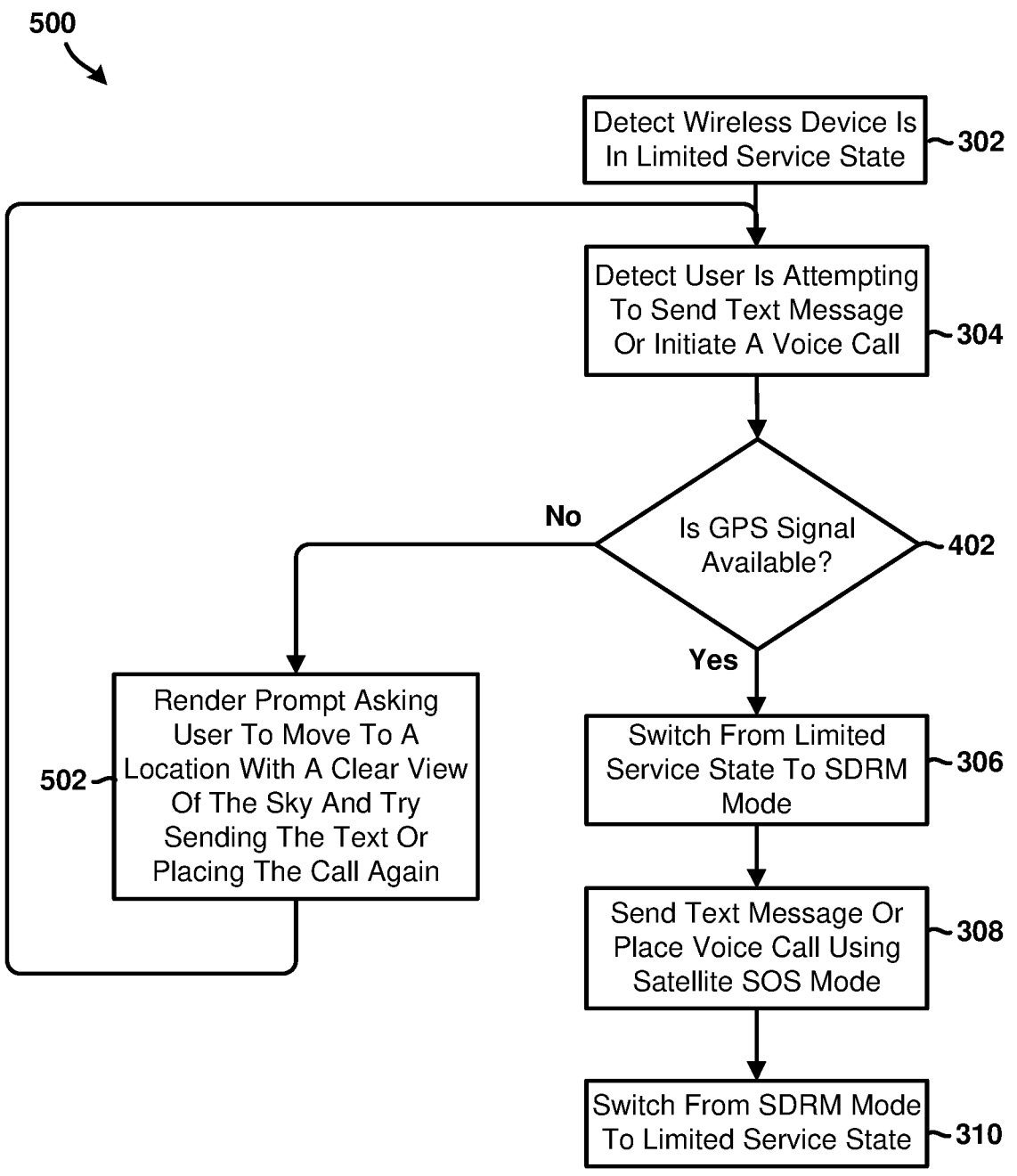

500

Detect Wireless Device Is In Limited Service State ~302

Detect User Is Attempting To Send Text Message Or Initiate A Voice Call ~304

Is GPS Signal Available? ~402

No

Yes

Render Prompt Asking User To Move To A Location With A Clear View Of The Sky And Try Sending The Text Or Placing The Call Again

502

Switch From Limited Service State To SDRM Mode ~306

Send Text Message Or Place Voice Call Using Satellite SOS Mode ~308

Switch From SDRM Mode To Limited Service State ~310

FIG. 5

ACTIVATING SATELLITE SOS MODE IN LIMITED SERVICE

BACKGROUND

Satellite-based SOS mode, also known as Emergency SOS via satellite coverage, is a feature that allows wireless device users to send emergency distress signals in areas with no cellular coverage. It may operate on the Iridium satellite constellation, which is a 66-satellite network that traditionally powered purpose-built satellite phones with external antennas. Modern wireless devices may use such satellite constellations to implement a call and messaging system that allows users to make emergency calls (e.g., 911 calls) and/or send short predefined emergency messages when there are no cellular connections. This feature may allow devices in remote locations (e.g., devices carried by hikers, campers, sailors, etc.) to send emergency messages to first responders or friends and family in case of an accident or emergency situation. It is also a useful feature for people living in areas with unreliable cellular coverage or in disaster-prone areas where communication infrastructure may be disrupted.

SUMMARY

Various aspects include methods and wireless devices configured to perform the methods of detecting when the wireless device is operating in a limited service state (LSS) mode, transition from operating in LSS mode to satellite-based SOS mode in response to the wireless device operating in LSS mode, and send a text message or place a call using the satellite-based SOS mode. Some aspects include methods for communicating via a satellite communication system by a wireless device that may include detecting when the wireless device is operating in a limited service state (LSS) mode, transitioning from operating in LSS to satellite-based SOS mode in response to the wireless device operating in LSS mode, and sending a text message or initiating a voice call using the satellite-based SOS mode. Some aspects further may include transitioning from operating in LSS mode to satellite-based SOS mode in response to detecting that the text message or voice call has been initiated on the wireless device operating in LSS mode. Some aspects may further include determining whether a global positioning system signal is available in response to in response to detecting that the text message or voice call has been initiated on the wireless device operating in LSS mode and transitioning from operating in LSS mode to satellite-based SOS mode in response to determining that the global positioning system signal is available. Some aspects may further include prompting the user to move to another location in response to determining that the global positioning system signal is not available.

Some aspects may further include transitioning from operating in satellite-based SOS mode to LSS mode in response to sending the text message or initiating the voice call. Some aspects may further include receiving text messages using the satellite-based SOS mode by sending an empty text message using the satellite-based SOS mode to initiate a polling sequence with the satellite system. Some aspects may further include establishing a connection to an acceptable cell and transition to operating in LSS mode in response to not finding a suitable cell to connect to or camp on, in response to not detecting a subscriber identify module (SIM), or in response to detecting another condition that prevents the wireless device from access its home network or a suitable partner or visiting network.

Further aspects include wireless devices including a processor configured to perform operations of any of the methods summarized above. Further aspects include wireless devices having means for performing any of the functions of the methods summarized above. Further aspects include non-transitory processor-readable medium having stored thereon processor-executable instructions configured to cause a processor of a wireless device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIGS. 3-5 are process flow diagrams illustrating methods of using a satellite system to send and receive calls and/or text messages when a wireless device is in a limited service state (LSS) mode.

DETAILED DESCRIPTION

Figure 1:
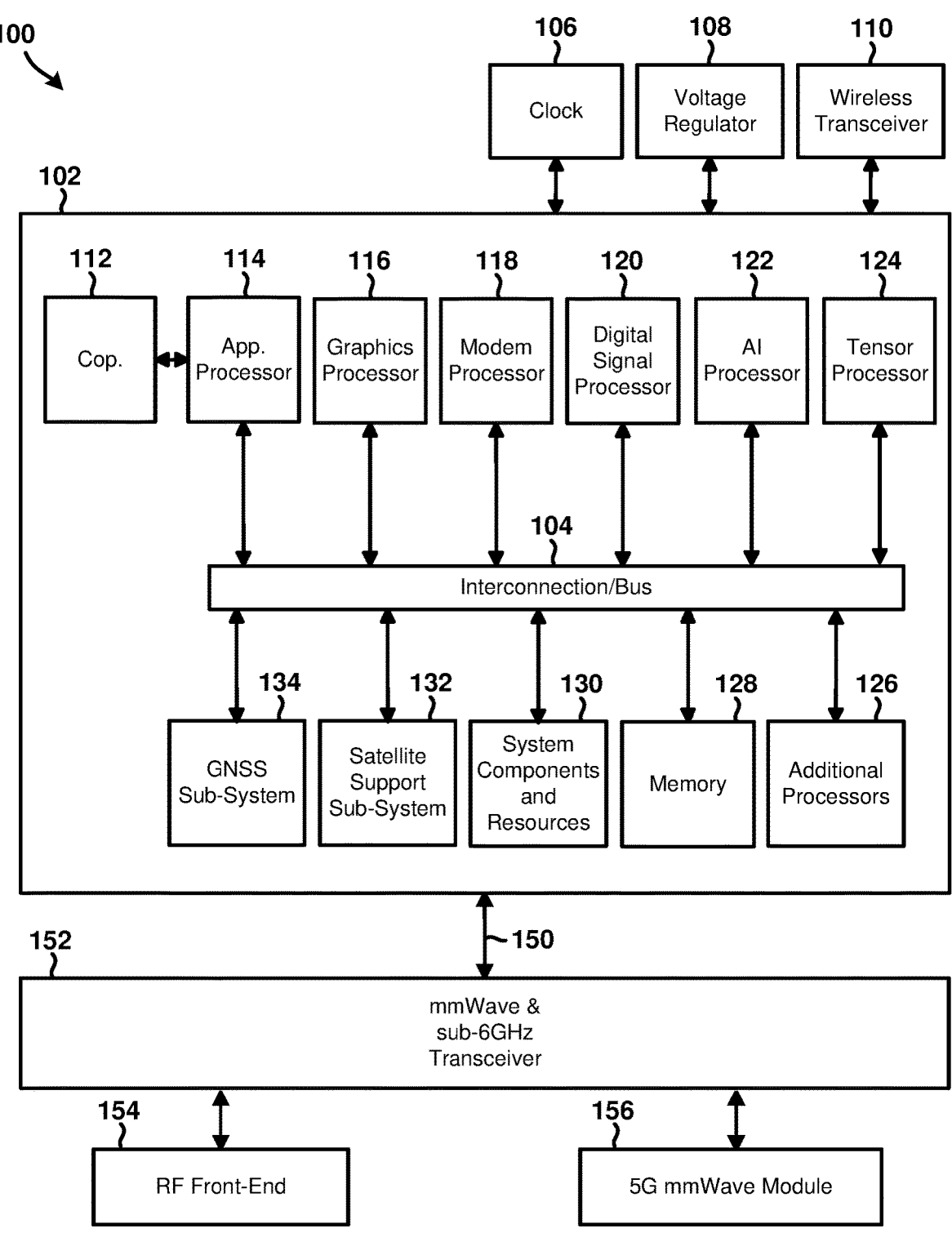
FIG. 1 is a block diagram illustrating a system on chip that could be included in a mobile or wireless computing device in accordance with some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

In overview, various embodiments include methods, and wireless devices configured to implement the methods, for automatically activating a Satellite SOS mode and using a satellite system to send and receive text messages and/or initiate or receive a call when a wireless device is in a limited service state (LSS) mode in which the wireless device includes a cellular connection to an "acceptable cell" that is not part of the wireless device's home network, not included in the device's preferred roaming list, and not part of a partner/visiting network associated with the home network. For example, the wireless device user may be traveling internationally, and the wireless device may be connected to AN "acceptable cell" of a foreign service provider that does not have any roaming or use agreements with the device's home service provider or home network.

The term "computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, smart glasses, head-mounted display, fitness tracker, etc.), media players (e.g., DVD players, ROKU™, AppleTV™, etc.), digital video recorders (DVRs), automotive displays, portable projectors, 3D holographic displays, and other similar devices that include a display and a programmable processor that can be configured to provide the functionality of various embodiments.

The term "wireless device" may be used herein to refer to any one or all of mobile devices, UE devices, internet-of-things (IoT) devices, cellular telephones, smartphones, personal or mobile multi-media players, laptop computers, tablet computers, ultrabooks, palm-top computers, wireless electronic mail receivers, multimedia Internet enabled cellular telephones, wireless gaming controllers, smart cars, connected vehicles, wearable device (e.g., HMD, etc.) and similar electronic devices which include a programmable processor, a memory and circuitry for sending and/or receiving wireless communication signals. While various embodiments are particularly useful in wireless mobile devices, such as smartphones and tablets, the embodiments are generally useful in any electronic device that includes a programmable processor suitable for executing extended reality software applications.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC also may include any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

Wireless devices may include a Universal Integrated Circuit Card (UICC), subscriber identification module (SIM), hardware, memory, or card that stores information required by one or more radio systems (e.g., in a cellular communication network base station, etc.) to identify, authenticate, and/or locate the wireless device. The stored information may include one or more authentication keys, an international mobile subscriber identity (IMSI) value, a temporary mobile subscriber identity (TMSI) value, a location area code (LAC), a home public land mobile network (HPLMN) value, and other similar identification, authentication, or location information.

An IMSI value may be a sixty-four (64) bit field or a fifteen (15) digit number that serves as an identifier for the wireless device and network. The first three digits of an IMSI value may store a Mobile Country Code (MCC) value, the next three digits may store a Mobile Network Code (MNC) value, and the remaining nine (9) digits may store a Mobile Station International Subscriber Directory Number (MSISDN), which may be a phone number associated with the SIM card in the wireless device. The combination of the MCC and MNC values may uniquely identify a specific cellular service provider (e.g., AT&T, Verizon, etc.) network in a specific country.

A wireless device may use a random-access procedure and a camp-on procedure to establish and maintain a connection with a cellular network. These procedures are inter-related and work together to provide reliable and seamless communications for wireless devices.

A wireless device may perform the random-access procedure when it needs to initiate a new connection with a wireless network. This may occur when the wireless device is powered on, moved to a new location, or needs to establish a new connection for some other reason. During the random-access procedure, the wireless device may send a request to the network to establish a connection. This request may include the wireless device's IMSI or other identifying information, as well as the type of service requested. The network (e.g., a base station, etc.) may respond with instructions for how to proceed with the connection setup, such as assigning a frequency channel and establishing a temporary identifier for the wireless device.

After the initial connection is established, the wireless device may need to move between different network areas or cells. When a device moves from one cell to another, it may perform a camp-on procedure to "camp on" to a new cell and register its presence with the new cell. The camp-on procedure may include exchanging signaling messages with the new cell to establish a connection and register the wireless device's presence. The wireless device may also update its location information and routing information with the network, which may be used to deliver incoming calls, messages, and data to the wireless device.

Thus, when a modem of a wireless device is powered on or the wireless device moves into a new geographical area, the modem scans the available networks to identify base stations in available networks through which the wireless device may connect to the global telecommunications network and ultimately to the Internet. This may be achieved by the wireless device receiving IMSI-based paging messages from surrounding base stations, and determining whether any of the received IMSI values (or the MCC/MNC values within the IMSI values) match the information stored on the wireless device's SIM. If the values match, the wireless device may establish a connection to a base station and camp thereon. When the values stored on the SIM do not match any of the values received from the available networks, the wireless device modem may perform roaming operations that include traversing a preferred roaming list to identify a visitor network through which the wireless device may connect to the global telecommunication network. If no suitable network is found, the wireless device does not establish a connection to a base station.

A wireless device may be configured to operate in a variety of different service states, including a full service state (FSS), a no service state (NSS), and a LSS mode. While operating in FSS, the wireless device may be connected to its home network, may transmit at full or near-full power level, may send and receive data, and/or access many or all the services and functions (e.g., voice, data, messaging, etc.) provided by the network.

The wireless device may operate in NSS when it is unable to connect to its home network or to another network that is included in its preferred roaming list. While operating in NSS, the wireless device may periodically attempt to re-establish a connection to the network but may not access any network services until it transitions out of NSS. In some embodiments, the wireless device may include a satellite communication module and/or a satellite-based SOS mode that may be activated when the wireless device is operating in NSS. When the satellite-based SOS mode is activated, the wireless device may switch to using the satellite communi-cation module and a satellite network to communicate emergency distress signals, emergency messages, and/or location information to registered parties. In conventional solutions, the satellite-based SOS mode may only be acti-vated when the wireless device is in NSS and has no cellular connectivity.

When the wireless device does not find a suitable cell to connect to or camp on, does not detect a SIM, or encounters other conditions that make it unable to access its home network or a suitable partner/visiting network, it may auto-matically establish a connection to any available network (e.g., "acceptable cell") and transition to operating the LSS mode. For example, a wireless device associated with a first cellular service provider (e.g., AT&T, etc.) that does not have a roaming agreement with a second cellular service provider (e.g., Verizon, etc.) may establish a connection to an acceptable cell in the second cellular service provider (e.g., Verizon, etc.) and transition to operating the LSS mode. While operating in LSS mode, the wireless device may have "partial connectivity" and/or access a small subset of the services and functions provided by the connected network, such as emergency calls (e.g., 911 calls, etc.) or restricted local operator services (RLOS).

In conventional solutions, services such as voice calls and short messaging services (SMS) may be unavailable or restricted while the wireless device remains in the LSS mode. In addition, because it has some cellular connectivity to a network (e.g., the acceptable cell), conventional wire-less devices may not allow for the activation or use of satellite-based SOS mode while the wireless device contin-ues to operate in LSS mode. As a result, using conventional solutions, a wireless device user cannot communicate with friends, family, other predefined contacts, but must instead rely on 911 services in emergency situations.

Various embodiments include wireless devices configured to automatically activate a Satellite SOS mode and a Satel-lite system to send and receive calls and/or text messages when the wireless device is in the LSS mode.

Various embodiments may be implemented on a number of single-processor and multiprocessor computer systems, including a system-on-chip (SOC) or system in a package (SIP). FIG. 1 illustrates an example computing system or SIP 100 architecture that may be used in mobile or wireless computing devices implementing various embodiments.

The example SIP 100 illustrated in FIG. 1 includes an SOC 102, a clock 106, a voltage regulator 108, a wireless transceiver 110, a mmWave & sub-6 GHZ transceiver 150, a radio frequency (RF) front-end 154, and a 5G mmWave module 156, any or all of which may communicate via interconnection/bus module(s) 150.

The example SOC 102 illustrated in FIG. 1 includes one or more coprocessors 112 (e.g., vector co-processor) con-nected to an applications processor 114, a graphics processor 116, a modem processor 118, a digital signal processor (DSP) 120, an artificial intelligence (AI) processor 122, tensor processor 124, and one or more additional processors 126 connected to one or more of the processors 112-126, memory 128, system components and resources 130, an interconnection/bus module 104, satellite support subsystem 132, and a global navigation satellite system (GNSS) sub-system 134.

The SOC 102 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 130 of the SOC 102 may include power amplifiers, voltage regulators, oscilla-tors, phase-locked loops, peripheral bridges, data control-lers, memory controllers, system controllers, Access ports, timers, and other similar components used to support the processors and software clients running on a mobile com-puting device. The system components and resources 130 may also include circuitry to interface with peripheral devices, such as cameras, electronic displays, wireless com-munication devices, external memory chips, etc.

The SOC 102 may further include an input/output module (not illustrated) for communicating with resources external to the SOC, such as the clock 106, voltage regulator 108, and wireless transceiver 110 (e.g., cellular wireless transceiver, Bluetooth transceiver, etc.). Resources external to the SOC (e.g., clock 106, voltage regulator 108, wireless transceiver 110) may be shared by two or more of the internal SOC processors/cores.

Various processors 112-126 may be interconnected to each other and to one or more memory elements 128, system components and resources 130, satellite support sub-systems 132 and/or Global Navigation Satellite System (GNSS) sub-systems. Similarly, the SOC 102 and/or mmWave & sub-6 GHZ transceiver 150 may be interconnected to the RF front-end 154 and 5G mm Wave module 156 via an inter-connection/bus module (not illustrated separately). The interconnection/bus modules (e.g., module 104, etc.) may include an array of reconfigurable logic gates and/or imple-ment a bus architecture (e.g., CoreConnect, AMBA, etc.). Communications may be provided by advanced intercon-nects, such as high-performance networks-on-chip (NoCs).

In some embodiments, the SOC 102 may operate as the central processing unit (CPU) of a wireless computing device that carries out the instructions of software applica-tion programs by performing the arithmetic, logical, control and input/output (I/O) operations specified by the instruc-tions. In some embodiments, the SOC 102 may communi-cate with a second SOC that operates as a specialized processing unit, such as a specialized 5G processing unit responsible for managing high volume, high speed (e.g., 5 Gbps, etc.), and/or very high-frequency short wavelength (e.g., 28 GHz mmWave spectrum, etc.) communications.

Generally, a modem or modem processor 118 is respon-sible for encoding and decoding the data transmitted over the network and RF components are responsible for trans-mitting and receiving the data over the airwaves. In some embodiments, the SOC 102 may be Modem-RF SOC that combines modem and radio frequency (RF) components into a single system. Integrating these components into a single system may allow for close coordination between the modem and RF components, which may in turn allow for more efficient management of power, data, and signal processing on the wireless device. That is, by integrating both components into a single system, the Modem-RF SOC may improve the overall performance, efficiency, latency, communication speeds, and power consumption characteristics of the wireless device.

The Modem-RF SOC may be configured to facilitate communications over 5G networks by converting data into radio waves and transmitting them over the air, receiving incoming data signals, and converting them into usable data for the wireless device. The Modem-RF SOC may include hardware (e.g., antennas, transceivers, processors, etc.) and software that manages the various functions of the system.

The AI processor 122 may be a specialized microprocessor or integrated circuit that is configured to handle various computational requirements of machine learning workloads. The AI processor 122 may include specialized hardware units, such as tensor acceleration units or neural network processing units, that are well suited for specific machine learning tasks, such as complex mathematical operations or tasks such as image recognition, natural language processing, and speech recognition. In some embodiments, the AI processor 122 may be configured to implement AI techniques that improve the performance of 5G networks. For example, the AI processor 122 may improve signal strength, reduce interference, and enhance the accuracy and reliability of location information. In some embodiments, the AI processor 122 may include or communicate with an AI-enhanced channel state feedback (CSF) component, AI-enhanced antenna tuning component, AI-enhanced Global Navigation Satellite System (GNSS) component, and/or a sensor-modem-RF component for mmWave beam management.

The tensor processor 124 may be a tensor processing unit (TPU), an AI tensor accelerator or a specialized hardware component that accelerates the performance of machine learning models that use tensor computations. Tensors are multi-dimensional arrays of data that are used in many machine learning algorithms, such as convolutional neural networks (CNNs) and recurrent neural networks (RNNs). The tensor processor 124 may include dedicated hardware units, such as matrix multipliers and tensor cores, that perform matrix and tensor operations with high speed and efficiency, thereby allowing machine learning models to be trained and executed faster than they would be using a general-purpose processor (e.g., applications processor 114, etc.). In some embodiments, the AI processor 122 may be configured to work in conjunction with the tensor processor 124. In some embodiments, the tensor processor 124 may be included in the AI processor 122 as a specialized hardware unit.

Each processor 112-126 may include one or more cores, and each processor/core may perform operations independent of the other processors/cores. For example, the SOC 102 may include a processor that executes a first type of operating system (e.g., FreeBSD, LINUX, etc.) and a processor that executes a second type of operating system (e.g., OS X, etc.). In addition, any or all of the processors 112-126 may be included as part of a processor cluster architecture (e.g., a synchronous processor cluster architecture, an asynchronous or heterogeneous processor cluster architecture, etc.).

Any or all of the processors 112-126 may operate as the CPU of the mobile computing device. In addition, any or all of the processors 112-126 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

In addition to the example SIP 100 discussed above, various embodiments may be implemented in a wide variety of computing systems, which may include a single processor, multiple processors, multicore processors, or any combination thereof.

Figure 2:
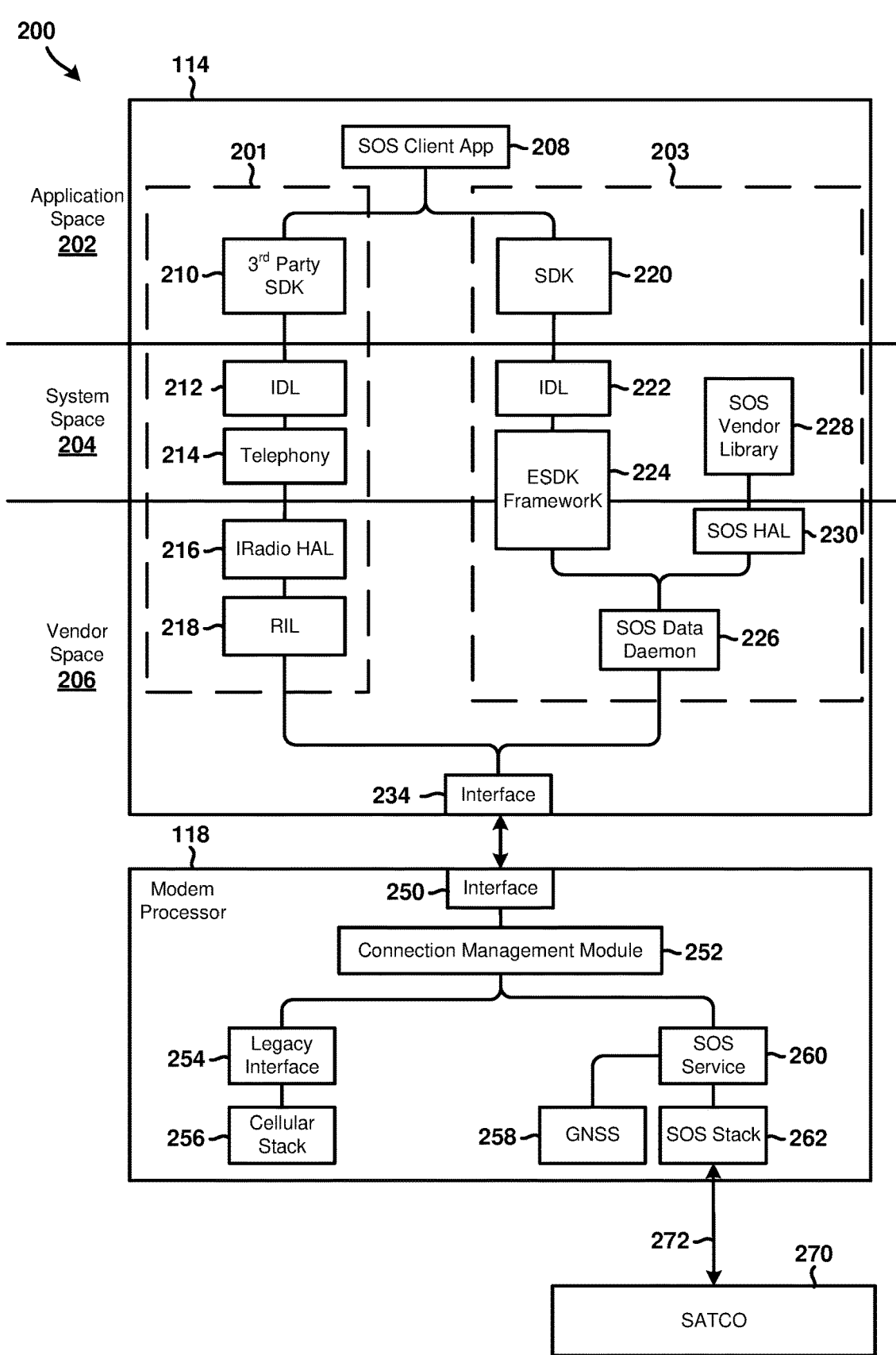
FIG. 2 is a block diagram illustrating example components in a mobile or wireless computing device that could be configured to use satellite-based SOS mode to send text messages and/or conduct a call in accordance with some embodiments.

FIG. 2 illustrates an example computing system 200 architecture that may be used in wireless devices implementing various embodiments. With reference to FIGS. 1 and 2, the application processor 114 may be divided into an application space 202, a system space 204, and a vendor space 206. The application processor 114 may include an SOS client application component 208, a third-party software development kit (SDK) component 210, an interface definition language (IDL) components 212, a telephony component 214, an iRadio hardware abstraction layer (HAL) component 216, a radio interface layer (RIL) component 218, any or all of which may be included as part of the operating system's telecommunications stack 201. The application processor 114 may also include an SDK component 220, an IDL component 222, an edge services development kit (ESDK) framework component 222, an SOS data daemon component 226, an SOS vendor library 228, and a SOS HAL component 230, any or all of which may be included as part of the operating system's satellite communications stack 203. The RIL component 218 and the SOS data daemon component 226 may communicate with a connection management module 252 in the modem processor 118 through interfaces 234, 250.

The modem processor 118 may include the connection management module 252, a legacy interface component 254, a cellular stack component 256, a global navigation satellite system (GNSS) component 258, an SOS service component 260, and an SOS stack component 262. The SOS stack component 262 may communicate with a satellite service component (SATCO) 270 via satellite links 272.

In some embodiments, the connection management module 252 may be configured to monitor the system to determine whether it is currently connected to a cellular network or operating in the no service state (NSS). The application processor 114 may be configured to activate the SOS client application 208 and the SOS vendor library 228 in response to determining (e.g., based on instructions or information received from the modem processor 118) that the wireless device is not currently connected to a cellular network. The components 220-230 in satellite communications stack 203 may work in conjunction with one another to provide on-demand sending and receiving of text message and/or voice calls over the satellite links 272 (e.g., using the Iridium Satellite constellation, etc.) when there is no cellular coverage and/or when the wireless device is operating in NSS.

In some embodiments, the wireless device may be configured to activate the SOS client application 208 and/or the SOS vendor library 228 in response to determining that the wireless device is operating in a LSS mode. In response, the wireless device may switch to operating in a self-organizing time division multiple access (SDRM) mode and/or the components 220-230 in the satellite communications stack 203 may work in conjunction with one another to provide on-demand sending and receiving of text message and/or conducting voice calls over the satellite links 272 (e.g., using the Iridium Satellite constellation, etc.) when there is limited cellular coverage.

Figure 3:
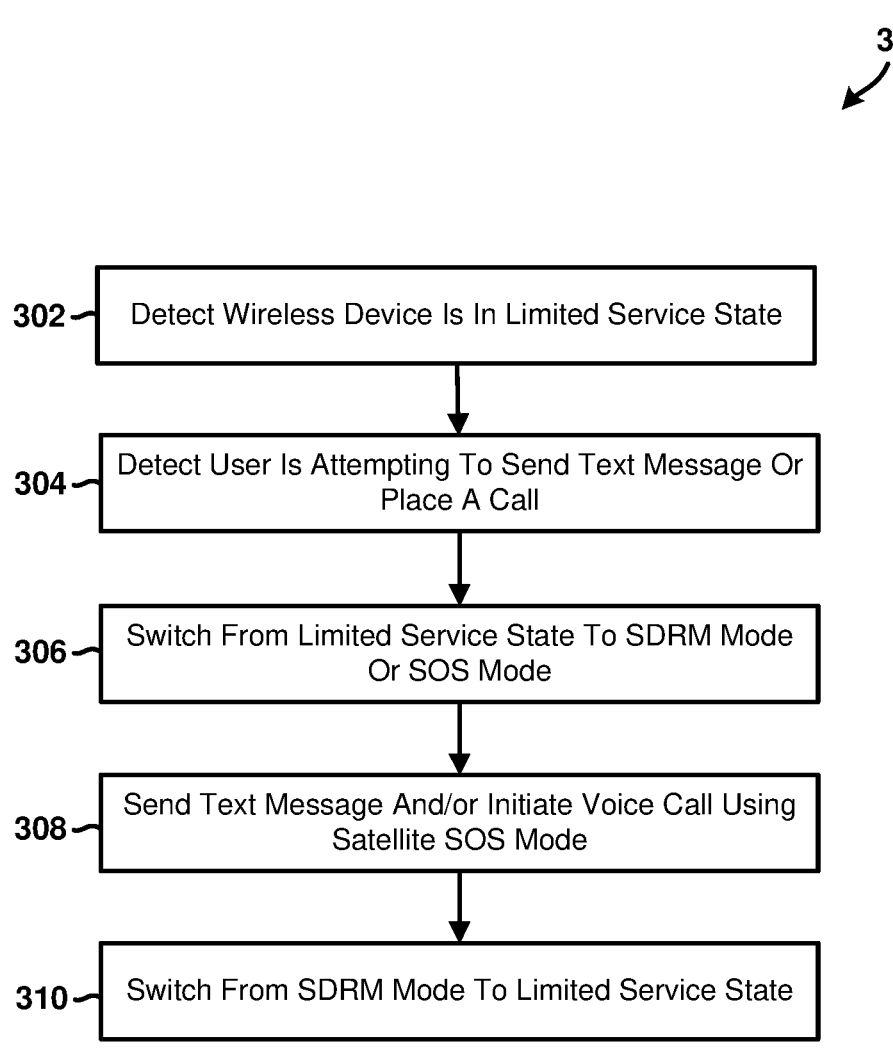

FIG. 3 illustrates a method 300 of activating a Satellite SOS mode and using a satellite system to send and receive calls and/or text messages when a wireless device is in a LSS mode in accordance with some embodiments. With reference to FIGS. 1-3, the operations of method 300 may be performed by a processor (e.g., processors 112-126, etc.) suitable for use in a wireless device. With reference to FIGS. 1-3, means for performing functions of the method 300 may include a processor (e.g., processors 112-126, etc.) of the wireless device.

In block 302, the processor may detect that the wireless device is operating in a LSS mode. As discussed above, when a wireless device does not find a suitable cell to connect to or camp on, does not detect a SIM, or encounters other conditions that make it unable to access its home network or a suitable partner/visiting network, it may automatically establish a connection to any available network (e.g., "acceptable cell") and transition to operating the LSS. For example, a wireless device associated AT&T may establish a connection to an acceptable cell in Vodafone and transition to operating in the LSS. While operating in LSS, the wireless device may have "partial connectivity" and/or access a small subset of the services and functions provided by the connected network, such as emergency calls (e.g., 911 calls, etc.) or restricted local operator services (RLOS).

In block 302, the processor may detect that the wireless device user is attempting to send a text message or initiate a voice call. The wireless device may use a combination of user inputs and software signals to detect when a user is attempting to send a text message or initiate a voice call. For example, when a user types a message on the wireless device, the processor may receive signals from the device's touch screen or keypad, and may interpret the inputs as text characters. As the user types, the processor may track the characters entered and determine whether they are part of a text message or a telephone number.

In addition to user inputs, the processor may also monitor the state of the device's software and/or hardware to detect when a text message is being sent or a call being initiated. For example, when a user selects the option to send a text message, the device's software may trigger a series of processes that prepare the message for transmission, including formatting the message, selecting the appropriate network and transmission protocol, and establishing a connection with the network. The processor may monitor these processes to determine whether the user is attempting to send a text message or initiate a voice call in block 304.

In block 306, the processor may switch from operating in the LSS mode to operating in self-organizing time division multiple access (SDRM) mode. In some embodiments, switching from LSS mode to SDRM in block 306 may trick the wireless device into thinking it is operating in no-service mode and/or may cause the wireless device to enter satellite-based SOS mode. For example, switching from LSS mode to SDRM in block 306 may activate the SOS client application 208 and/or the SOS vendor library 228 and/or any or all of the components 220-230 in the satellite communications stack 203 to work together and provide services for on-demand sending and receiving text message and/or initiating and receiving a voice call over the satellite links.

In block 308, the processor may send the text message or initiate a voice call using the satellite-based SOS mode. For example, the processor may activate the SOS mode on the wireless device to initiate SOS mode, establish a connection with the satellite network (e.g., using a specialized communication protocol designed for satellite-based communication systems, etc.), format the message (e.g., headers, metadata) according to the requirements of the satellite-based communication system, and transmit the text message or initiate a voice call via the satellite network to an appropriate ground-based station for forwarding to the recipient or called party. In some embodiments, the wireless device may also receive confirmation that a text message has been successfully transmitted and/or received by the appropriate recipient. The confirmation may be displayed on the device's screen or communicated through audio or vibration alerts.

In block 310, the processor may switch from SDRM mode back to the limited service state (i.e., LLS mode). For example, the processor may switch from SDRM mode back to the LLS mode in order to maintain a stable and reliable connection with the network, utilize the features that are available in the limited service state, conserve battery life, etc.

Figure 4:
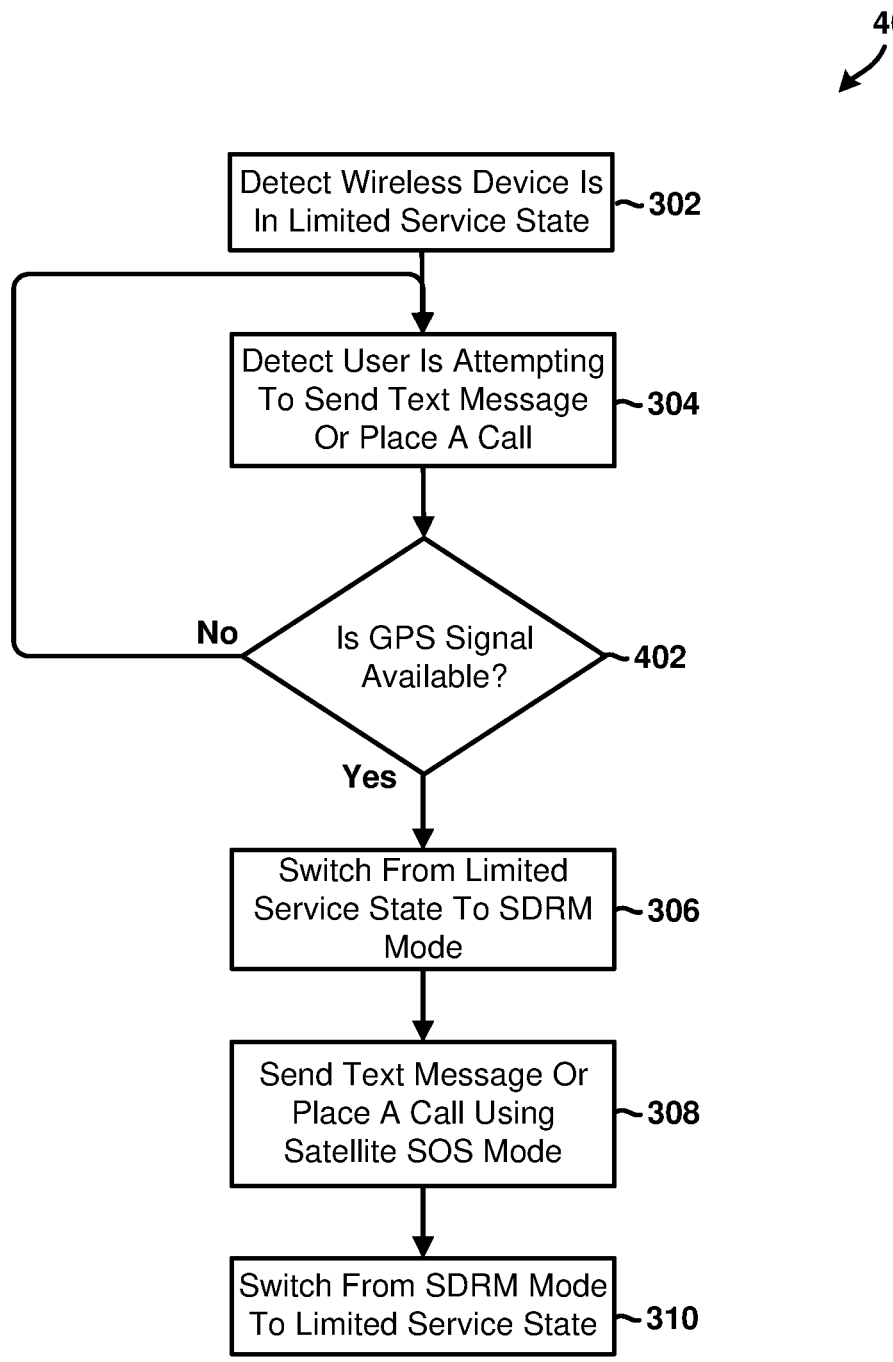

FIG. 4 illustrates a method 400 of activating a Satellite SOS mode and using a satellite system to send and receive messages when a wireless device is in a LSS mode in accordance with some embodiments. With reference to FIGS. 1-4, the operations of method 400 may be performed by a processor (e.g., processors 112-126, etc.) suitable for use in a wireless device. With reference to FIGS. 1-4, means for performing functions of method 400 may include a processor (e.g., processors 112-126, etc.).

In blocks 302 and 304, the processor may perform the operations of like numbered blocks of the method 300 as described. In determination block 402, the processor may determine whether a global positioning signal is available. The availability of such signals would indicate to the wireless device that there is a high probability that the wireless device will be able to establish satellite communication links to the satellite network.

In response to determining that a global positioning signal is not available (i.e., determination block 402="No"), the processor may continue to monitor the wireless device to determine whether the wireless device user attempts to send a text message or initiate a voice call while the wireless device continues to operate in the LSS.

In response to determining that a global positioning signal is available (i.e., determination block 402="Yes"), the processor may perform the operations of blocks 306-310 of the method 300 as described.

FIG. 5 illustrates another method 500 of activating a Satellite SOS mode and using a satellite system to send and receive messages when a wireless device is in a LSS mode in accordance with some embodiments. With reference to FIGS. 1-5, the operations of method 500 may be performed by a processor (e.g., processors 112-126, etc.) suitable for use in a wireless device. With reference to FIGS. 1-5, means for performing functions of method 500 may include a processor (e.g., processors 112-126, etc.).

In blocks 302 and 304, the processor may perform the operations of the like numbered blocks of the method 300 as described. In determination block 402, the processor may perform the operations of the like numbered block of the method 400 as described. In response to determining that a global positioning signal is available (i.e., determination block 402="Yes"), the processor may perform the operations of blocks 306-310 of the method 300 as described.

In response to determining that a global positioning signal is not available (i.e., determination block 402="No"), the processor may render a prompt that asks the user to move to a location with a clear view of the sky and retry sending the text message or initiating the voice call again.

Figure 6:
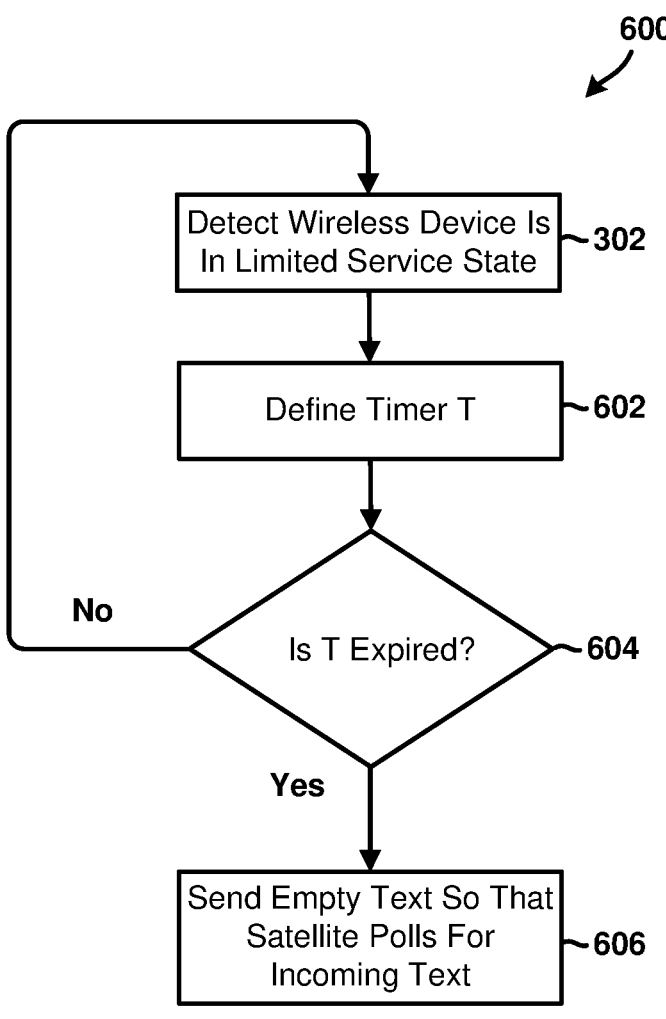
FIG. 6 is a process flow diagram illustrating a methods of causing a satellite system to poll for incoming text messages.

FIG. 6 illustrates a method 600 of activating a Satellite SOS mode and using a satellite system to receive messages when a wireless device is in a LSS mode in accordance with some embodiments. With reference to FIGS. 1-6, the operations of method 600 may be performed by a processor (e.g., processors 112-126, etc.) suitable for use in a wireless device. With reference to FIGS. 1-6, means for performing functions of method 500 may include a processor (e.g., processors 112-126, etc.).

In block 302, the processor may perform the operations of the like numbered block of the method 300 as described. In block 602, the processor may define a timer T. The processor may define the timer T by setting a specific time period, typically measured in milliseconds or seconds, and configuring the timer to count down from the set value. For example, the processor may define a timer T of 10 seconds, which would mean that the timer would count down from 10 seconds to 0. The processor may also control the behavior of the timer by setting various parameters, such as the timer mode (count up or count down), the timer interrupt behavior (generate an interrupt when the timer reaches 0), and the timer resolution (the granularity of the timer, typically measured in microseconds). In some embodiments, the processor may include dedicated hardware or software timers that are designed to automatically trigger an interrupt or other event when the timer value reaches zero, making it easier for the processor to detect when the timer has expired. After timer T is defined and configured, the processor may use the timer to perform various functions, such as periodically sending empty text messages or polling for signals.

In determination block 604, the processor may determine whether the timer T has expired. For example, the processor may continuously or repeatedly monitor the value of the timer to determine whether it has reached zero. The processor may check the timer value in several ways, depending on the specific hardware and software design of the wireless device, such as by polling the timer register or by using interrupts. When the timer value reaches zero, the processor may detect that the timer has expired by comparing the timer value to a predefined threshold. The processor may set this threshold to a specific value, typically zero, to indicate that the timer has reached its end. In some embodiments, when the timer value reaches the threshold, the timer may trigger an interrupt, set a flag monitored by the processor or perform another action to indicate to the processor that the timer has expired.

In block 606, the processor may send an empty text message using the satellite-based SOS mode so that the satellite system polls for incoming texts and relays any pending or undelivered text messages to the wireless device. That is, sending an empty text message in block 606 may initiate a polling sequence with the satellite system. When the satellite system receives an empty message, it may recognize that a message has been sent and automatically initiate a polling sequence to check for any incoming messages or signals. During the polling sequence, the satellite system may transmit a signal to the wireless device, prompting the wireless device to send any pending messages or data. This is particularly useful when the wireless device operates in LSS and is unable to transmit data. By sending an empty message and initiating a polling sequence in block 606, the wireless device may ensure that any pending data or messages are transmitted to and from the satellite system as quickly as possible.

The methods 300, 400, 500, 600 may allow wireless devices to offload Bluetooth related functionality from the application processor to a lower-power processor, thereby allowing the high-speed application processor to be turned off to save power. For example, Bluetooth applications may leverage a Bluetooth stack running on the low-power processor instead of relying on the Bluetooth stack running on the high-speed application processor. As another example, in a smartwatch with a small battery, notification functionalities could be offloaded to the low-power processor to conserve energy.

Figure 7:
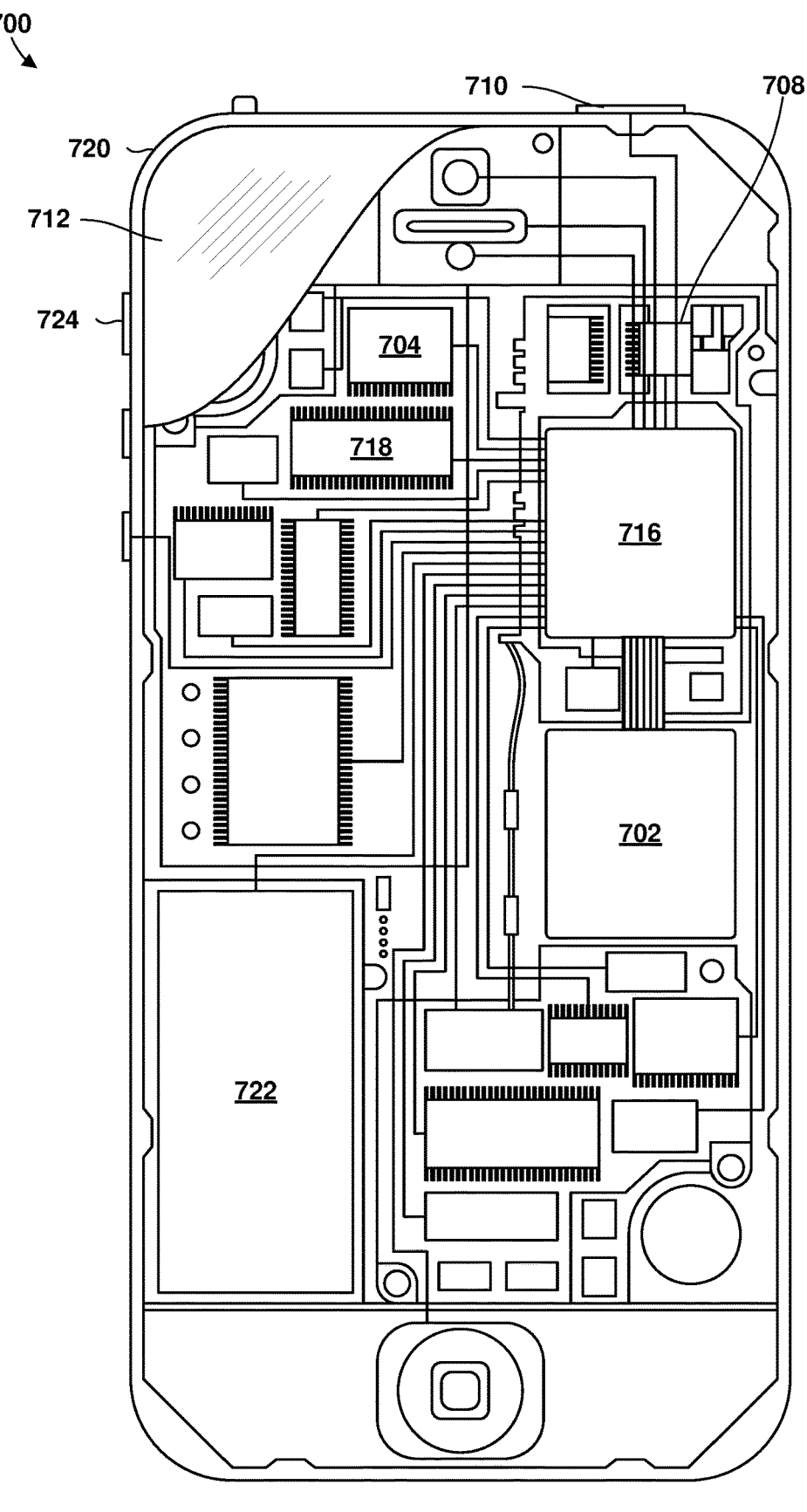
FIG. 7 is a component block diagram illustrating an example wireless device suitable for implementing various embodiments.

Various embodiments (including, but not limited to, embodiments described above with reference to FIGS. 1-6) may be implemented in a wide variety of wireless devices, an example of which suitable for use with the various embodiments is illustrated in FIG. 7. The wireless device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless device 700 need not have touch screen capability.

The wireless device 700 may have one or more radio signal transceivers 708 (e.g., Peanut, Bluetooth, ZigBee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The wireless device 700 may include a cellular network wireless modem chip 716 that enables communication via a cellular network and is coupled to the processor.

The wireless device 700 may include a peripheral device connection interface 718 coupled to the processor 702. The peripheral device connection interface 718 may be singularly configured to accept one type of connection or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The wireless device 700 may also include speakers 714 for providing audio outputs. The wireless device 700 may also include a housing 720, constructed of a plastic, metal, or a combination of materials, for containing all or some of the components described herein. The wireless device 700 may include a power source 722 coupled to the processor 702, such as a disposable or rechargeable battery. The rechargeable battery may also be coupled to the peripheral device connection port to receive a charging current from a source external to the mobile computing device 700. The wireless device 700 may also include a physical button 724 for receiving user inputs. The wireless device 700 may also include a power button 726 for turning the mobile computing device 700 on and off.

Implementation examples are described in the following paragraphs. While the following implementation examples are described in terms of example methods, further example implementations may include: the example methods discussed in the following paragraphs implemented in a wireless device including a processor configured to perform operations of the example methods; the example methods discussed in the following paragraphs implemented by a wireless device including means for performing functions of the example methods; and the example methods discussed in the following paragraphs implemented as a non-transitory processor-readable storage medium having stored thereon processor-executable instructions configured to cause a processor of a wireless device to perform the operations of the example methods.

Example 1. A example for communicating via a satellite communication system by a wireless device, including: detecting when the wireless device is operating in a limited service state (LSS) mode; transitioning from operating in LSS to satellite-based SOS mode in response to the wireless device operating in LSS mode; and sending a text message or initiating a voice call using the satellite-based SOS mode.

Example 2. The method of example 1, further including transitioning from operating in LSS mode to satellite-based SOS mode in response to detecting that the text message or voice call has been initiated on the wireless device operating in LSS mode.

Example 3. The method of either of example 1 or example 2, further including: determining whether a global positioning system signal is available in response to in response to detecting that the text message or voice call has been initiated on the wireless device operating in LSS mode; and transitioning from operating in LSS mode to satellite-based SOS mode in response to determining that the global positioning system signal is available.

Example 4. The method of any of examples 1-3, further including prompting the user to move to another location in response to determining that the global positioning system signal is not available.

Example 5. The method of any of examples 1-4, further including transitioning from operating in satellite-based SOS mode to LSS mode in response to sending the text message or initiating the voice call.

Example 6. The method of any of examples 1-5, further including receiving text messages using the satellite-based SOS mode by sending an empty text message using the satellite-based SOS mode to initiate a polling sequence with the satellite system.

Example 7. The method of any of examples 1-6, further including establishing a connection to an acceptable cell and transition to operating in LSS mode in response to not finding a suitable cell to connect to or camp on, in response to not detecting a subscriber identify module (SIM), or in response to detecting another condition that prevents the wireless device from access its home network or a suitable partner or visiting network.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, or any other medium that may be used to store desired program code in the form of instructions or data structures and that may be accessed by a computer. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A wireless device, comprising:
   a processor configured to:
      detect the wireless device is operating in a limited service state (LSS) mode;
      transition from operating in LSS to satellite-based SOS mode in response to the wireless device operating in LSS mode;
      transmit a first text message to initiate polling of a satellite in communication with the wireless device for incoming text messages or voice calls from the wireless device, wherein the first text message is an empty text message;
      receive a response from the satellite to prompt the wireless device to transmit data; and
      send a second text message or initiate a voice call using the satellite-based SOS mode.

2. The wireless device of claim 1, wherein the processor is further configured to transition from operating in LSS mode to satellite-based SOS mode in response to detecting that the second text message or voice call has been initiated on the wireless device operating in LSS mode.

3. The wireless device of claim 2, wherein the processor is configured to:
   determine whether a global positioning system signal is available in response to in response to detecting that the second text message or voice call has been initiated on the wireless device operating in LSS mode; and
   transition from operating in LSS mode to satellite-based SOS mode in response to determining that the global positioning system signal is available.

4. The wireless device of claim 3, wherein the processor is configured to render a prompt asking a user to move to another location in response to determining that the global positioning system signal is not available.

5. The wireless device of claim 1, wherein the processor is further configured to transition from operating in satellite-based SOS mode to LSS mode in response to sending the second text message or initiating the voice call.

6. The wireless device of claim 1, wherein the processor is configured to establish a connection to an acceptable cell and transition to operating in LSS mode in response to not finding a suitable cell to connect to or camp on, in response to not detecting a subscriber identify module (SIM), or in response to detecting another condition that prevents the wireless device from access its home network or a suitable partner or visiting network.

7. A method for communicating via a satellite communication system by a wireless device, comprising:
   detecting when the wireless device is operating in a limited service state (LSS) mode;
   transitioning from operating in LSS to satellite-based SOS mode in response to the wireless device operating in LSS mode;
   transmitting a first text message to initiate polling of a satellite in communication with the wireless device for incoming text messages or voice calls from the wireless device, wherein the first text message is an empty text message;
   receiving a response from the satellite to prompt the wireless device to transmit data; and
   sending a second text message or initiating a voice call using the satellite-based SOS mode.

8. The method of claim 7, further comprising transitioning from operating in LSS mode to satellite-based SOS mode in response to detecting that the second text message or voice call has been initiated on the wireless device operating in LSS mode.

9. The method of claim 8, further comprising:
   determining whether a global positioning system signal is available in response to in response to detecting that the second text message or voice call has been initiated on the wireless device operating in LSS mode; and
   transitioning from operating in LSS mode to satellite-based SOS mode in response to determining that the global positioning system signal is available.

10. The method of claim 9, further comprising prompting a user to move to another location in response to determining that the global positioning system signal is not available.

11. The method of claim 7, further comprising transitioning from operating in satellite-based SOS mode to LSS mode in response to sending the second text message or initiating the voice call.

12. The method of claim 7, further comprising establishing a connection to an acceptable cell and transition to operating in LSS mode in response to not finding a suitable cell to connect to or camp on, in response to not detecting a subscriber identify module (SIM), or in response to detecting another condition that prevents the wireless device from access its home network or a suitable partner or visiting network.

13. A wireless device, comprising:

means for detecting when the wireless device is operating in a limited service state (LSS) mode;

means for transitioning from operating in LSS to satellite-based SOS mode in response to the wireless device operating in LSS mode;

means for transmitting a first text message to initiate polling of a satellite in communication with the wireless device for incoming text messages or voice calls from the wireless device, wherein the first text message is an empty text message;

means for receiving a response from the satellite to prompt the wireless device to transmit data; and means for sending a second text message or initiating a voice call using the satellite-based SOS mode.

14. The wireless device of claim 13, further comprising means for transitioning from operating in LSS mode to satellite-based SOS mode in response to detecting that the second text message or voice call has been initiated on the wireless device operating in LSS mode.

15. The wireless device of claim 14, further comprising:

means for determining whether a global positioning system signal is available in response to in response to detecting that the second text message or voice call has been initiated on the wireless device operating in LSS mode; and means for transitioning from operating in LSS mode to satellite-based SOS mode in response to determining that the global positioning system signal is available.

16. The wireless device of claim 15, further comprising means for prompting a user to move to another location in response to determining that the global positioning system signal is not available.

17. The wireless device of claim 13, further comprising means for transitioning from operating in satellite-based SOS mode to LSS mode in response to sending the second text message or initiating the voice call.

18. The wireless device of claim 13, further comprising means for establishing a connection to an acceptable cell and transition to operating in LSS mode in response to not finding a suitable cell to connect to or camp on, in response to not detecting a subscriber identify module (SIM), or in response to detecting another condition that prevents the wireless device from access its home network or a suitable partner or visiting network.

19. A non-transitory processor-readable medium having stored thereon processor-executable instructions configured to cause a processor of a wireless device to perform operations comprising:

detecting when the wireless device is operating in a limited service state (LSS) mode;

transitioning from operating in LSS to satellite-based SOS mode in response to the wireless device operating in LSS mode;

transmitting a first text message to initiate polling of a satellite in communication with the wireless device for incoming text messages or voice calls from the wireless device, wherein the first text message is an empty text message;

receiving a response from the satellite to prompt the wireless device to transmit data; and sending a second text message or initiating a voice call using the satellite-based SOS mode.

20. The non-transitory processor-readable medium of claim 19, further comprising transitioning from operating in LSS mode to satellite-based SOS mode in response to detecting that the second text message or voice call has been initiated on the wireless device operating in LSS mode.

21. The non-transitory processor-readable medium of claim 20, further comprising:

determining whether a global positioning system signal is available in response to in response to detecting that the second text message or voice call has been initiated on the wireless device operating in LSS mode; and transitioning from operating in LSS mode to satellite-based SOS mode in response to determining that the global positioning system signal is available.

22. The non-transitory processor-readable medium of claim 21, further comprising prompting a user to move to another location in response to determining that the global positioning system signal is not available.

23. The non-transitory processor-readable medium of claim 19, further comprising transitioning from operating in satellite-based SOS mode to LSS mode in response to sending the second text message or initiating the voice call.

24. The non-transitory processor-readable medium of claim 19, further comprising establishing a connection to an acceptable cell and transition to operating in LSS mode in response to not finding a suitable cell to connect to or camp on, in response to not detecting a subscriber identify module (SIM), or in response to detecting another condition that prevents the wireless device from access its home network or a suitable partner or visiting network.

25. The wireless device of claim 1, wherein the empty text message is a text message without input text characters.

26. The method of claim 7, wherein the empty text message is a text message without input text characters.

27. The wireless device of claim 13, wherein the empty text message is a text message without input text characters.

28. The non-transitory processor-readable medium of claim 19, wherein the empty text message is a text message without input text characters.

* * * * *